US010922636B2

(12) United States Patent
Asokan

(10) Patent No.: US 10,922,636 B2
(45) Date of Patent: Feb. 16, 2021

(54) DISPLAY CONTROL SYSTEM AND METHOD FOR CONTROLLING A DISPLAY OF PROJECT MANAGEMENT OBJECTS

(71) Applicant: ORACLE INTERNATIONAL CORPORATION, Redwood Shores, CA (US)

(72) Inventor: Saju Asokan, Trivandrum (IN)

(73) Assignee: Oracle International Corporation, Redwood Shores (CA)

( * ) Notice: Subject to any disclaimer, the term of this patent is extended or adjusted under 35 U.S.C. 154(b) by 344 days.

(21) Appl. No.: 15/331,977

(22) Filed: Oct. 24, 2016

(65) Prior Publication Data

US 2018/0114178 A1  Apr. 26, 2018

(51) Int. Cl.
*G06Q 10/06* (2012.01)
*G06Q 10/10* (2012.01)

(52) U.S. Cl.
CPC ... *G06Q 10/063118* (2013.01); *G06Q 10/067* (2013.01); *G06Q 10/063116* (2013.01); *G06Q 10/109* (2013.01)

(58) Field of Classification Search
CPC ... G06Q 10/063118; G06Q 10/063116; G06Q 10/109
See application file for complete search history.

(56) References Cited

U.S. PATENT DOCUMENTS

| 4,644,532 | A | * | 2/1987 | George | H04L 45/02 370/255 |
| 6,321,133 | B1 | * | 11/2001 | Smirnov | G06Q 10/06 700/100 |
| 6,854,088 | B2 | | 2/2005 | Massengale et al. | |
| 7,313,755 | B2 | * | 12/2007 | Rahman | H04N 21/4825 715/203 |

(Continued)

FOREIGN PATENT DOCUMENTS

WO   WO-2004107189 A2 * 12/2004 ........... G06F 9/4494

OTHER PUBLICATIONS

"Using the Time Slider window." ArcMap, Mar. 25, 2016, http://desktop.arcgis.com/en/arcmap/10.3/map/time/using-the-time-slider.htm. (Year: 2016).*

(Continued)

*Primary Examiner* — Matthew S Gart
*Assistant Examiner* — Tiera J Fletcher
(74) *Attorney, Agent, or Firm* — Kraguljac Law Group, LLC

(57) ABSTRACT

Systems, methods, and other embodiments are disclosed to control a display of objects. In one embodiment, a project plan is displayed which includes multiple task nodes linked together by control nodes over a timeline. An instruction is received to generate and link a new task node between two of the task nodes in response to choosing a control node between the two task nodes. A task create window is displayed which includes input fields to input task informa- (Continued)

tion to specify the new task node. In response to the task information being input, the new task node is created and linked between the two task nodes. The timeline is adjusted based on the new task node to generate an updated timeline of the project plan. An updated project plan is displayed which includes the multiple task nodes and the new task node linked together over the updated timeline.

18 Claims, 10 Drawing Sheets

(56) References Cited

U.S. PATENT DOCUMENTS

| | | | |
|---|---|---|---|
| 7,428,724 B2 | 9/2008 | Pike et al. | |
| 7,496,583 B2* | 2/2009 | Moore | G06F 16/10 |
| 8,108,241 B2 | 1/2012 | Shukoor | |
| 8,387,037 B2* | 2/2013 | Henseler | G06F 8/63 |
| | | | 717/168 |
| 8,942,160 B2* | 1/2015 | Horio | H04L 1/08 |
| | | | 370/319 |
| 9,927,941 B2* | 3/2018 | Steimle | G06F 3/048 |
| 2010/0125814 A1 | 5/2010 | Lemons | |
| 2012/0290323 A1 | 11/2012 | Barsoum et al. | |
| 2013/0159198 A1 | 6/2013 | Cartan et al. | |
| 2013/0246112 A1* | 9/2013 | Comstock | G06Q 10/06315 |
| | | | 705/7.15 |
| 2015/0046856 A1 | 2/2015 | Rucker et al. | |

OTHER PUBLICATIONS

Mohio Ltd, Mohiomap, What can you do with Mohiomap?, 2015, pp. 1-4, downloaded on Oct. 14, 2016 from: https://www.moh.io/mohiomap/welcome.php.

Mohio Ltd, Mohiomap, Is your project on Track?, 2015, pp. 1-2, downloaded on Oct. 14, 2016 from: https://www.moh.io/mohiomap/page.php?v=mohiomap-for-projects.

Roadmap, Multiple Projects, Multiple Apps., One Roadmap, 2015, pp. 1-6, downloaded on Oct. 14, 2016 from: https://ppmroadmap.com.

Matchware A/S, MindView—Project Management Software, 2015, pp. 1-9, downloaded on Oct. 14, 2016 from: http://www.matchware.com/en/products/mindview/mindview2_be/project_management.htm.

Gamezhero, Tentacle Wares, 2015, pp. 1-3, downloaded on Oct. 14, 2016 from: http://www.gamezhero.com/games/tentaclewar-sthepurplemenace#walkthrough.

* cited by examiner

DISPLAY CONTROL SYSTEM AND METHOD FOR CONTROLLING A DISPLAY OF PROJECT MANAGEMENT OBJECTS

BACKGROUND

Project planning and task management has been a crucial functionality supported by many enterprise applications. Tabular data entry to capture task and resource details, followed by incorporation of a visualization tool such as a Gantt chart, is widely followed by the industry. However, such tabular data entry (e.g., via tree tables) can be cumbersome and time consuming and does not provide for the easy creation, deletion, and re-alignment of tasks in a visually intuitive manner.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments are disclosed for controlling a display of project management objects. In the field of project planning, a project plan may be electronically implemented in a computerized project planning application. A project manager can create tasks and sub-tasks (represented as nodes) associated with a project within the electronic project plan with respect to a timeline of dates. The nodes are generated, within a computerized project plan, which represent actual tasks and sub-tasks of a project to be performed in the real world.

The following terms are used herein with respect to various embodiments.

The term "task node" as used herein, refers to a computerized object (e.g., including at least a data structure) defined within a computerized project plan which represents a task to be completed for a project, for example, in the real world. A task node may be linked to other task nodes within a computerized project plan, for example, via a linked list. A task node may be represented as a project management display object within a graphical user interface and may be manipulated via the graphical user interface.

The term "sub-task node", as used herein, refers to a computerized object (e.g., including at least a data structure) defined within a computerized project plan which represents a sub-task to be completed for a project, where the sub-task is part of a larger task. A sub-task node is linked to a task node within a computerized project plan, for example, via a linked list. A sub-task node may be represented as a project management display object within a graphical user interface and may be manipulated via the graphical user interface.

The term "control node", as used herein, refers to a computerized object (e.g., including at least a data structure) defined within a computerized project plan which represents a trigger for creating a new task node or a new sub-task node. A control node may be represented as a project management display object between two task nodes, or attached to a sub-task node, within a graphical user interface and may be manipulated via the graphical user interface. In one embodiment, a control node includes a linked list that links two task nodes.

Figure 1:
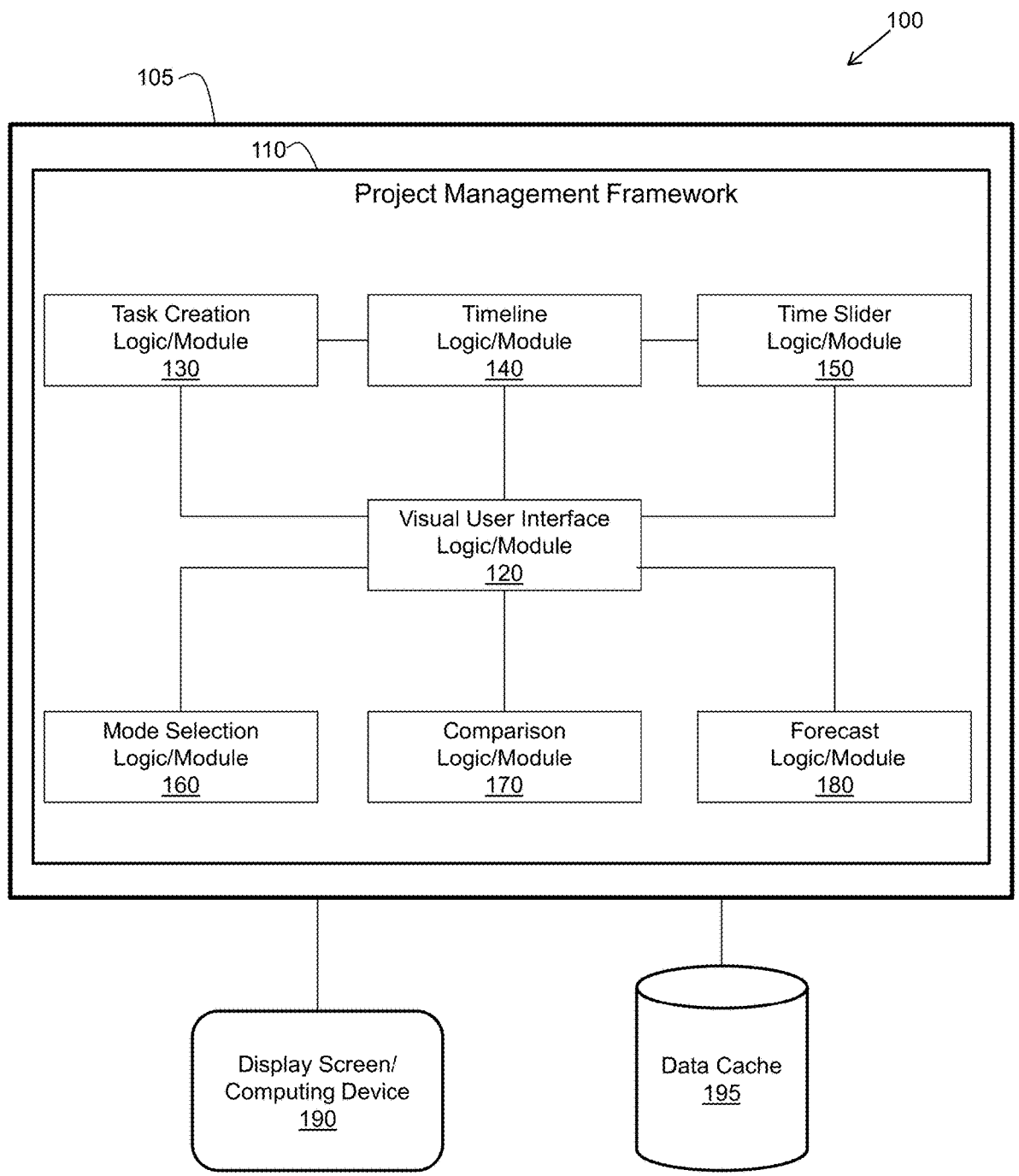
FIG. 1 illustrates one embodiment of a computer system, having a computing device configured with a project management framework.

FIG. 1 illustrates one embodiment of a computer system 100, having a computing device 105 configured with a project management framework 110. The project management framework 110 is configured to computerize the process of creating, deleting, and moving tasks (and associated sub-tasks) within a computerized project plan in a visually intuitive manner. For example, in one embodiment, the project management framework 110 is configured to display a computerized project plan within a graphical user interface. The project plan includes multiple task nodes, each representing a task, linked together by control nodes over a timeline that includes multiple dates. The project management framework 110 is also configured to create and link a new task node, representing a new task, between two task nodes of the multiple task nodes.

When a user selects a control node between the two task nodes via the graphical user interface, a task create window is displayed within the graphical user interface. The task create window includes input fields to input task information defining (specifying) the new task represented by the new task node. When the task information is input, the new task node is created and linked between the two task nodes.

As part of creating and linking the new task node, a new control node is created between the new task node and the first of the two task nodes. Also, another new control node is created between the new task node and the second of the two task nodes. The timeline of the computerized project plan is adjusted based on the new task node to generate an updated timeline. Also, an updated project plan is displayed within the graphical user interface that includes the multiple task nodes and the new task node linked together over the updated timeline.

In one embodiment, the system 100 is a computing/data processing system including an application or collection of distributed applications for enterprise organizations. The applications and computing system 100 may be configured to operate with or be implemented as a cloud-based networking system, a software-as-a-service (SaaS) architecture, or other type of computing solution.

The embodiments described herein allow for creating and linking tasks of a project plan in a computerized manner. Visual user interface logic provides a graphical user interface with which a user (e.g., a project manager) may interact to easily generate task nodes and sub-task nodes within a computerized project plan and form time-dependent relationships between the nodes.

With reference to FIG. 1, in one embodiment, the project management framework 110 is implemented on the computing device 105 and includes logics or modules for implementing and controlling various functional aspects of the project management framework 110. In one embodiment, the project management framework 110 includes visual user interface logic/module 120, task creation logic/module 130, timeline logic/module 140, time slider logic/module 150, mode selection logic/module 160, comparison logic/module 170, and forecast logic/module 180. In accordance with one embodiment, the various logics/modules are configured to communicate with each other, as needed, to perform the various functions described herein.

Other embodiments may provide different logics or combinations of logics that provide the same or similar functionality, and control of that functionality, as the project management framework 110 of FIG. 1. In one embodiment, the project management framework 110 is an executable application including program modules configured to perform the functions of the logics. The application is stored in a non-transitory computer storage medium. That is, in one embodiment, the logics of the project management framework 110 are implemented as modules of instructions stored on a computer-readable medium.

The computer system 100 also includes a display screen 190 operably connected to the computing device 105. In accordance with one embodiment, the display screen 190 is implemented to display views of and facilitate user interaction with a graphical user interface (GUI) generated by visual user interface logic 120. The graphical user interface may be used, for example, for controlling user selection of records of project management plans from a data cache 195. The graphical user interface may also be used to allow the user to interact with project management objects viewed on the display screen 190. The graphical user interface may be associated with a project management program and visual user interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 190 may represent multiple computing devices/terminals that allow users (e.g., project managers) to access and receive services from the project management framework logic 110 via networked computer communications.

In one embodiment, the computer system 100 further includes data cache 195 operably connected to the computing device 105 and/or a network interface to access the data cache 195 via a network connection. In accordance with one embodiment, the data cache 195 is configured to store project management plans and/or templates of project management plans.

Referring back to the logics of the project management logic 110 of FIG. 1, in one embodiment, visual user interface logic 120 is configured to generate a graphical user interface (GUI) to facilitate user interaction with the project management logic 110. For example, visual user interface logic 120 includes program code that generates and causes the graphical user interface to be displayed based on an implemented graphical design of the interface. In response to user actions and selections via the GUI, associated aspects of manipulating a computerized project plan may be performed. For example, a user may employ the GUI to create task nodes representing real-world tasks, and link the task nodes to each other along a timeline.

For example, in one embodiment, visual user interface logic 120 is configured to facilitate receiving inputs and reading data in response to user actions. For example, visual user interface logic 120 may facilitate selection, reading, and inputting of an electronic file of a project plan. A project plan may be generated and stored in at least one data structure (e.g., within data cache 195) associated with (and accessible by) a project management application (e.g., the project management framework 110) via the graphical user interface.

Furthermore, visual user interface logic 120 is configured to facilitate the outputting and displaying of a computerized project plan via the graphical user interface on the display screen 190. Task nodes, sub-task nodes, control nodes and their linked relationships to each other may be output and displayed as part of the computerized project plan. For example, FIG. 2 illustrates one embodiment of a displayed project plan 200 that is created and displayed on the display screen 190 using the project management framework 110 of FIG. 1.

In one embodiment, task creation logic 130 is configured to display a project plan (e.g., project plan 200 of FIG. 2) within the graphical user interface, provided by visual user interface logic 120, on the display screen 190. The project plan may include multiple task nodes (project management objects), each representing a task of the project plan, linked together by control nodes (project management objects) over a timeline that includes multiple time increments (e.g., dates). In one embodiment, time progresses from left to right on the displayed project plan 200. As can be seen in FIG. 2, each of the task nodes includes a central region showing a numerical metric, associated with a corresponding task, as part of the project plan as displayed within the graphical user interface. In one embodiment, the numerical metric represents at least a current amount of progress to completion of the corresponding task.

Figure 2:
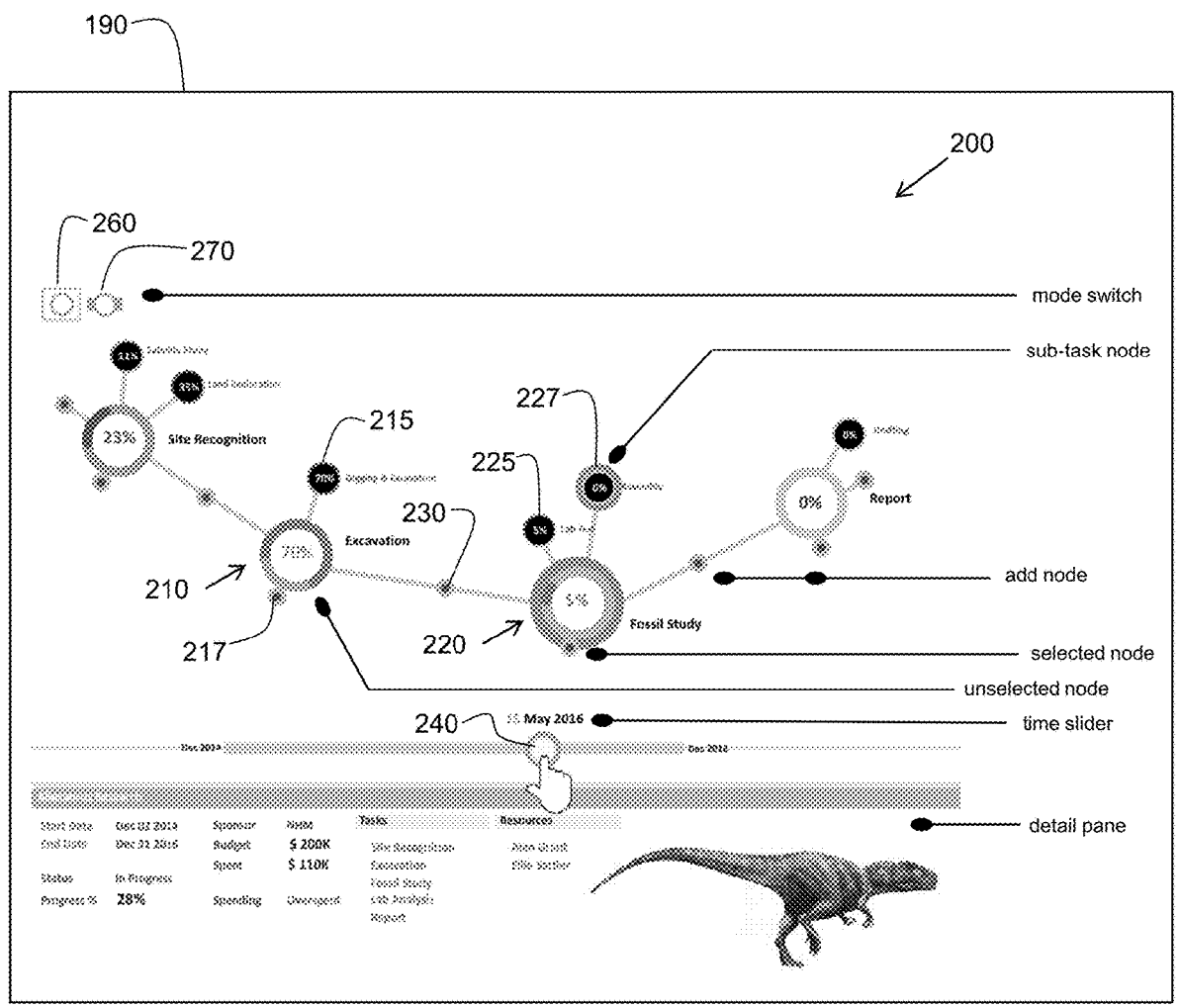
FIG. 2 illustrates one embodiment of a displayed project plan that is created and displayed using the project management framework of FIG. 1.

Referring to FIG. 2, a task node 210 represents an excavation task having a child sub-task node 215 representing a digging and excavation sub-task. A task node 220 represents a fossil study task having a sub-task 225 representing a lab test sub-task and another sub-task node 227 representing an assembly sub-task. The task node 210 and the task node 220 are linked together via a control node 230. The task node 210 has a control node 217 attached. The control node 217 may be used to generate another child sub-task node off of the parent task node 210.

In an alternative embodiment, the task nodes of FIG. 2 may instead be project nodes representing different projects that are to be completed according to a timeline. Each project node may be associated with multiple task nodes representing multiple tasks that make up the project. In accordance with one embodiment, upon selecting a project node, the associated task nodes are displayed within the graphical user interface for that project. The various functions described herein with respect to task nodes may also apply to project nodes.

Figure 3:
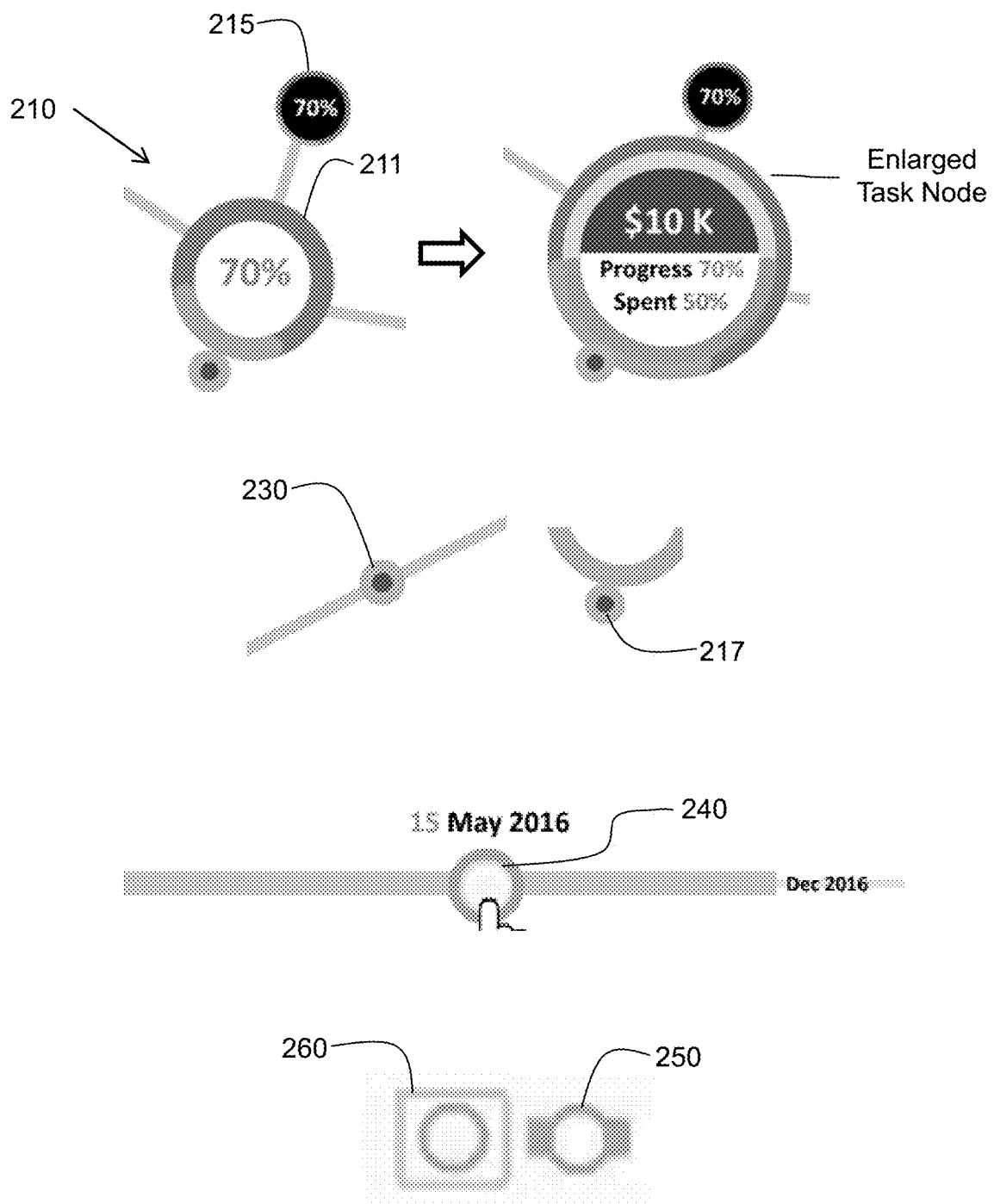
FIG. 3 illustrates example diagrams showing several features provided by the displayed project plan of FIG. 2.

FIG. 3 illustrates example diagrams showing several features provided by the displayed project plan 200 of FIG. 2. FIG. 3 shows the task node 210 having a circular region where the child sub-task node 215 originates from the parent task node 210. In accordance with one embodiment, a node may include a center region that shows an important metric (e.g., numerically) which is also represented in an outer ring of the node, for example, as a circular progress bar (e.g., circular progress bar 211).

In one embodiment, when a task node is selected, the node is enlarged to show more information within the center region as shown in FIG. 3. FIG. 3 also shows the control node 230 and the control node 217 which can be selected to trigger the creation of a new task or sub-task, respectively. FIG. 3 also shows a time slider 240 (a project management object) which can be used to scroll in time across the project plan, as discussed in more detail later herein. FIG. 3 further shows mode selection icons 250 and 260 (project management objects) which can be used to switch between a normal mode and a timeline mode of the graphical user interface, as discussed in more detail later herein.

In one embodiment, task creation logic 130 may receive at least one instruction (e.g., an instruction from visual user interface logic 120) to generate and link a new task node, representing a new task of the project plan, between two task nodes. The instruction is in response to a user choosing a control node between the two task nodes via the graphical user interface. In response to receiving the instruction, task creation logic 130 displays a task create window within the graphical user interface on the display screen. The task create window includes input fields for inputting task information to specify the new task represented by the new task node.

Figure 4:
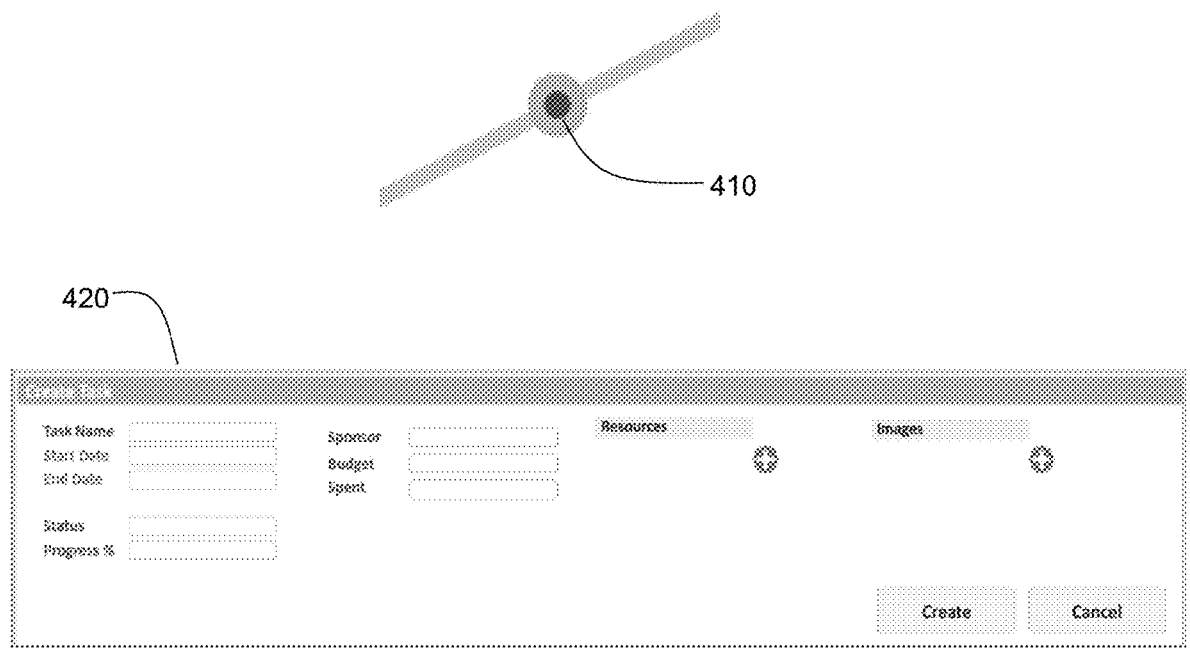
FIG. 4 illustrates example diagrams showing features associated with creating a task node.

FIG. 4 illustrates example diagrams showing features associated with creating a task node. For example, referring to FIG. 4, when the control node 410 is chosen, the task create window 420 is displayed. The task create window 420 has various input fields that allow task information to be input to specify the new task. The task information may include, for example, a task name, a start date, an end date, a status, progress, a sponsor, a budget, an amount spent, and assigned resources. Other task information is possible as well in accordance with other embodiments.

Upon task information being inputted into the input fields of the task create window (e.g., by a project manager user via the graphical user interface), task creation logic 130 generates the new task node and automatically links the new task node between the two task nodes via two new control nodes. In one embodiment, the new task node includes at least one child control node attached to the new task node. The child control node may be triggered to generate a sub-task node as discussed later herein. This process improves prior processes of how a computer generates and links nodes together in a linked data structure and generates corresponding display objects by at least reducing the number of actions needed to be performed.

In one embodiment, timeline logic 140 is configured to adjust the timeline of the project plan based on the new task node to generate an updated timeline of the project plan. For example, inserting a new task node into the project plan may cause the start and end dates of other task nodes of the project plan to be modified, resulting in an updated timeline. The updated timeline may be limited by certain defined constraints of the project plan (e.g., a fixed and definitive end date of the entire project plan). Timeline logic 140 is also configured to display an updated project plan within the graphical user interface on the display screen 190, where the updated project plan includes the multiple task nodes and the new task node linked together over the updated timeline.

Figure 5:
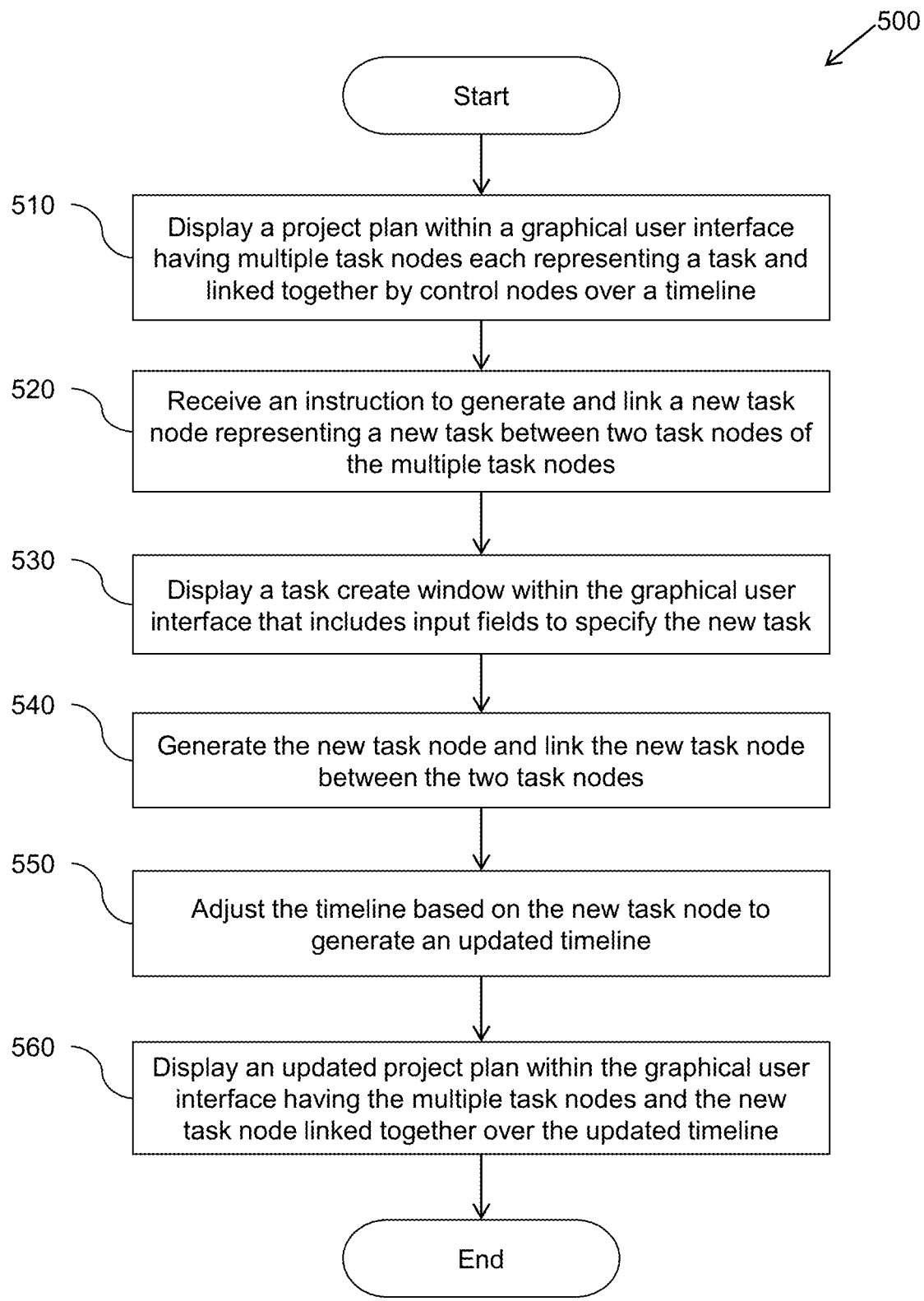
FIG. 5 illustrates one embodiment of a method, which can be performed by the project management framework of the computer system of FIG. 1, to create a new task within a computerized project plan.

FIG. 5 illustrates one embodiment of a method 500, which can be performed by the project management framework 110 of the computer system 100 of FIG. 1, to create a new task within a computerized project plan. Method 500 describes operations of the project management framework 110 and is implemented to be performed by the project management framework 110 of FIG. 1, or by a computing device configured with a program code of the method 500. For example, in one embodiment, method 500 is implemented by a computing device configured to execute a computer application. The computer application is configured to process data in electronic form and includes stored executable instructions that perform the functions of method 500.

The method 500 will be described from the perspective that a project plan is made up of representations of tasks (e.g., task nodes) that can be linked together to form a timeline of tasks. In one embodiment, the project management framework 110 is configured to select, create, edit, move, and delete task nodes of a computerized project plan in a visually intuitive manner.

Upon initiating method 500, at block 510, a project plan is displayed within a graphical user interface. The project plan includes multiple task nodes, each representing a task, linked together by control nodes over a timeline that includes multiple time increments (e.g., dates). In accordance with one embodiment, the project plan is displayed on the display screen 190 of FIG. 1 via visual user interface logic 120 of FIG. 1 as initiated by task creation logic 130 of FIG. 1. At block 520, an instruction is received to generate and link a new task node, representing a new task, between two task nodes of the multiple task nodes in response to a user choosing a control node between the two task nodes via the graphical user interface. In one embodiment, the instruction is received by task creation logic 130 of FIG. 1 from visual user interface logic 120 of FIG. 1.

At block 530, a task create window is displayed within the graphical user interface in response to receiving the instruction. The task create window includes input fields to input task information to specify the new task represented by the new task node. In one embodiment, task creation logic 130 of FIG. 1 displays the task create window on the display screen 190 of FIG. 1 via visual user interface logic 120 of FIG. 1 in response to receiving the instruction. At block 540, the new task node is generated and linked between the two task nodes, via two new control nodes, in response to the task information being input into the input fields. The new task node includes a child node attached to the new task node, in accordance with one embodiment. In one embodiment, the new task node is generated by task creation logic 130 of FIG. 1.

At block 550, the timeline of the project plan is adjusted based on the new task node to generate an updated timeline of the project plan. In one embodiment, timeline logic 140 of FIG. 1 analyzes the project plan having the new task node and adjusts the timeline accordingly. At block 560, an updated project plan is displayed within the graphical user interface. The updated project plan includes the multiple task nodes and the new task node linked together over the updated timeline. In one embodiment, timeline logic 140 of FIG. 1 displays the updated project plan on the display screen 190 of FIG. 1 via visual user interface logic 120 of FIG. 1 in response to generating the updated timeline.

In this manner, a new task node, representing a new task, may be generated within a computerized project plan in a visually intuitive manner. A user simply has to click on a control node and specify task information for the new task in a task create window that automatically pops up in the graphical user interface. The new task node is then automatically created within the project plan and the entire timeline of the project plan is automatically updated based on the various constraints of the various tasks and of the overall project plan.

In one embodiment, task creation logic 130 may receive an instruction from visual user interface logic 120 in response to a user grabbing and dragging a task node of the multiple task nodes from a first position to a second position within the timeline of the project plan via the graphical user interface. For example, a user may want to move a task node to an earlier or later position within the timeline. In response to receiving the instruction, task creation logic 130 moves the task node from the first position to the second position within the graphical user interface and timeline logic 140 adjusts the timeline of the project plan, based on the task node moving to the second position, to generate an updated timeline of the project plan. An updated project plan may be displayed within the graphical user interface via visual user interface logic 120, where the updated project plan includes the multiple task nodes, with the moved task node at the second position, linked together over the updated timeline.

In one embodiment, task creation logic 130 is configured to receive at least one other instruction (e.g., an instruction from visual user interface logic 120) to generate a sub-task node, representing a sub-task of the new task, and link the sub-task node to the new task node. The instruction is in response to a user choosing the child control node attached to the new task node via the graphical user interface. In response to receiving the instruction, task creation logic 130 displays a sub-task create window within the graphical user interface on the display screen 190. The sub-task create window includes input fields for inputting sub-task information to specify the sub-task represented by the sub-task node. Upon sub-task information being inputted into the input fields of the sub-task create window (e.g., by a project manager user via the graphical user interface), task creation logic 130 generates the sub-task node and links the sub task node to the new task node.

In one embodiment, timeline logic 140 is configured to again adjust the timeline of the project plan based on the sub-task node to generate another updated timeline of the project plan. For example, creating a sub-task node for the new task node in the project plan may cause the start and end dates of the new task node to be modified, resulting in an updated timeline. The updated timeline may be limited by certain defined constraints of the project plan (e.g., a fixed and definitive start date of the sub-task node). Timeline logic 140 is also configured to display another updated project plan within the graphical user interface on the display screen 190, where the updated project plan includes the multiple task nodes, the new task node, and the sub-task node linked together over the updated timeline.

In this manner, task nodes and sub-task nodes may be added to a project plan. In a similar manner, the concept may be extended to deleting task nodes and sub-task nodes from a project plan, causing the linking between nodes and the timeline to change accordingly. Various constraints and/or rules may be defined which are followed by the project management framework when adding or deleting nodes from a project plan.

In one embodiment, time slider logic 150 is configured to display a time slider within the graphical user interface on the display screen 190 as part of the project plan. FIG. 2 shows the time slider 240 which can be scrolled horizontally along the displayed project plan by a user. Time slider logic 150 is also configured to receive at least one instruction (e.g., an instruction from visual user interface logic 120) to scroll the time slider 240 to a specific date within the timeline. The instruction is in response to a user grabbing and moving the time slider 240 via the graphical user interface. In response to receiving the instruction, time slider logic 150 scrolls the time slider 240 within the graphical user interface to the specific date.

For example, in one embodiment, time slider logic 150 is configured to select a task node associated with the specific date in response to scrolling the time slider 240 under the task node. For example, the specific date may correspond to one of the days that the task associated with the task node is to be performed and therefore, that task node is selected. Time slider logic 150 is also configured to display an updated project plan within the graphical user interface on the display screen 190 in response to selecting the task node. The updated project plan includes additional task information associated with the selected task node. In one embodiment, the additional task information is displayed proximate to the selected task node (e.g., in a pop-up window within the graphical user interface).

In one embodiment, time slider logic 150 is configured to receive an instruction from visual user interface logic 120 to activate a calendar function. The instruction is received in response to a user choosing (selecting) the time slider via the graphical user interface. In response to receiving the instruction, time slider logic 150 is configured to activate the calendar function to display a calendar within the graphical user interface. Time slider logic 120 is configured to receive another instruction from visual user interface logic 120 to select a specific date from the calendar. The instruction is received in response to the user choosing the specific date from the calendar via the graphical user interface. In response to receiving the instruction, time slider logic 150 is configured to select the specific date. Time slider logic is also configured to display an updated project plan within the graphical user interface on the display screen 190 in response to selecting the specific date. The updated project plan includes the time slider re-positioned within the time line at a new position corresponding to the specific date as selected.

Figure 6:
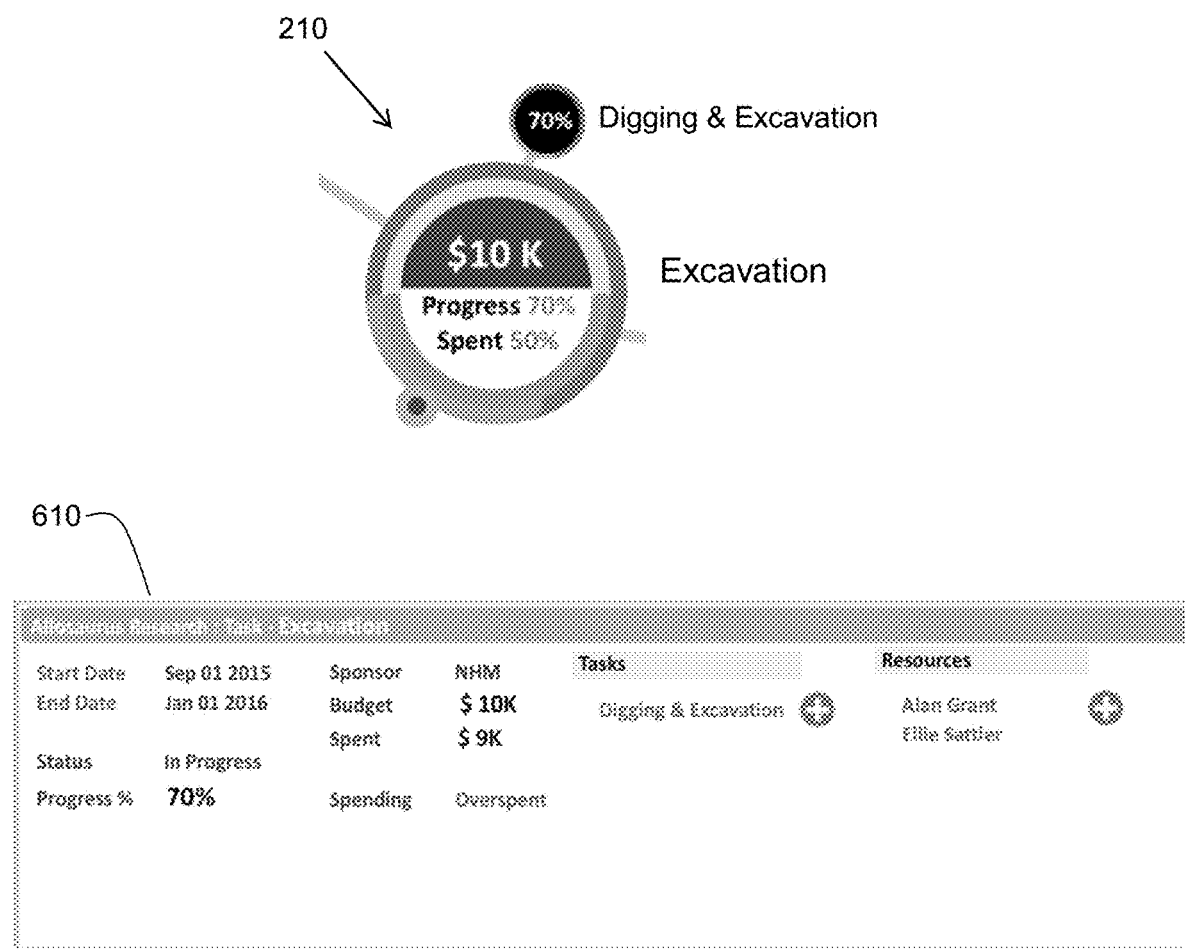
FIG. 6 illustrates example diagrams showing features associated with selecting a task node.

FIG. 6 illustrates example diagrams showing features associated with selecting a task node. Referring to FIG. 6, when the task node 210 is selected, the task node 210 is enlarged and shows more information within the central region of the task node 210. Also, a detail pane 610 pops up or slides in on the graphical user interface to show additional details of the selected task node 210. Such additional details may include, for example, a sponsor, a budget, and money spent to date. Other details are possible as well, in accordance with other embodiments.

Figure 7:
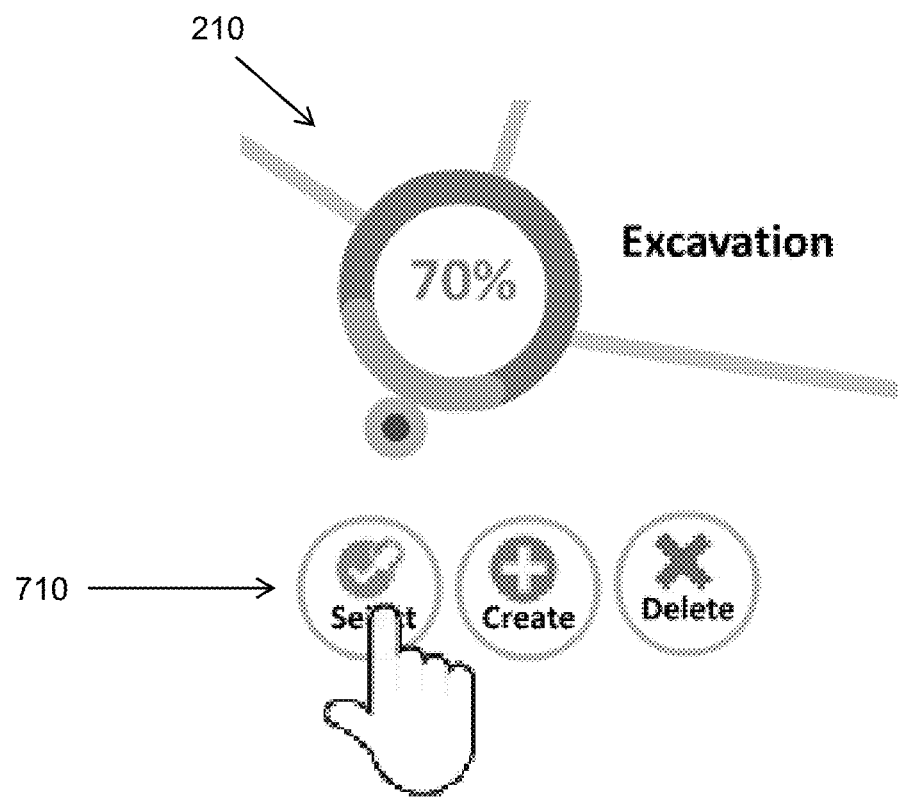
FIG. 7 illustrates an example diagram showing how a context menu may be triggered for a task node.

FIG. 7 illustrates an example diagram showing how a context menu may be triggered for a task node. As shown in FIG. 7, a user may click and hold on the task node 210, for example, to trigger a context menu 710 from which a user can invoke actions including select, create, and delete. In this manner, a the task node 210 can be selected, deleted, or replaced with a new task node to be created.

In one embodiment, mode selection logic 160 is configured to receive at least one instruction (e.g., an instruction from visual user interface logic 120) to switch from a normal mode of the graphical user interface to a timeline mode of the graphical user interface. The instruction is in response to a user choosing the timeline mode via the graphical user interface. FIG. 2 shows a timeline mode icon 270 which can be chosen by a user via the graphical user interface. In response to receiving the instruction, mode selection logic 160 switches from the normal mode to the timeline mode. Similarly, mode selection logic 160 is configured to receive at least one instruction to switch back to the normal mode of the graphical user interface. FIG. 2 shows a normal mode icon 260 which can be chosen by a user via the graphical user interface.

Figure 8:
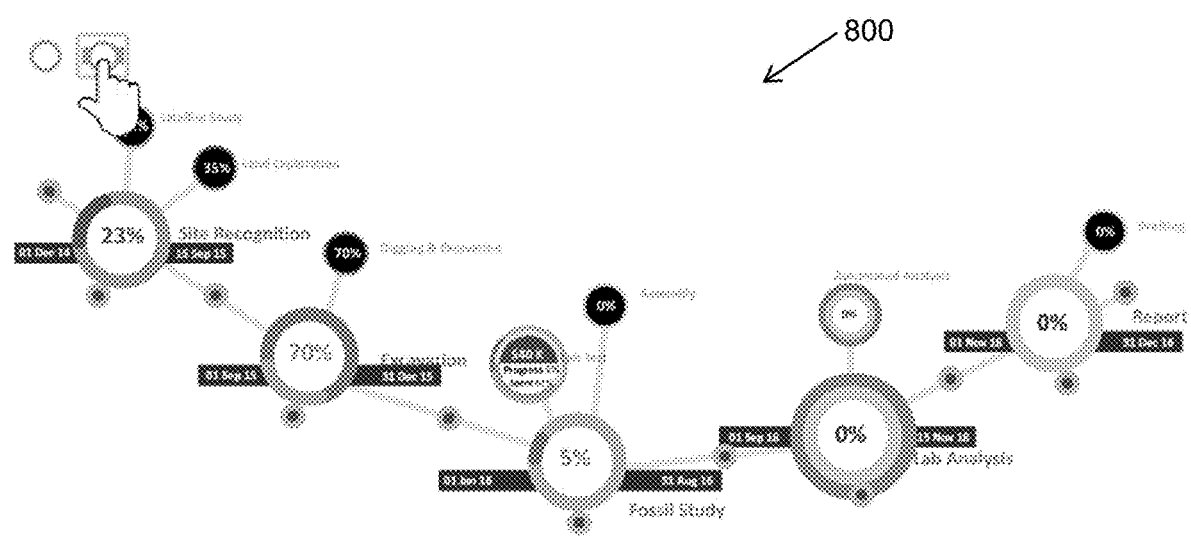
FIG. 8 illustrates another embodiment of a displayed project plan that is created and displayed using the project management framework of FIG. 1.

Mode selection logic 160 is also configured to display an updated project plan within the graphical user interface on the display screen 190 in response to switching from the normal mode to the timeline mode. The updated project plan includes a time span within the graphical user interface for each of the task nodes. The time span identifies a start date and an end date between which a corresponding task is to be performed. FIG. 8 illustrates another embodiment of a displayed project plan 800 that is created and displayed using the project management framework 110 of FIG. 1. Each of the task nodes of FIG. 8 show a displayed time span with a start date and an end date as a result of the timeline mode being selected. A time span is illustrated as horizontal bars extending out of either side of a task node in FIG. 8, in accordance with one embodiment.

In one embodiment, comparison logic 170 is configured to receive at least a first instruction (e.g., an instruction from visual user interface logic 120) to select a first task node. The first instruction is in response to a user choosing the first task node via the graphical user interface. Comparison logic 170 is also configured to receive at least a second instruction (e.g., an instruction from visual user interface logic 120) to select a second task node. The second instruction is in response to the user choosing the second task node via the graphical user interface. In response to receiving the first instruction and the second instruction, comparison logic 170 is configured to select, respectively, the first task node and the second task node.

In one embodiment, comparison logic 170 is configured to receive at least a third instruction (e.g., an instruction from visual user interface logic 120) to activate a comparison operation. The third instruction is in response to the user choosing the comparison operation via the graphical user interface. In response to receiving the third instruction, comparison logic 170 is configured to generate at least one comparison result by comparing at least one parameter associated with a first task represented by the first task node as selected with at least one corresponding parameter associated with a second task represented by the second task node as selected. Comparison logic 170 is also configured to generate a comparison window within the graphical user interface. The comparison window includes the comparison results. The project plan is updated within the graphical user interface on the display screen 190 to include the comparison window having the comparison results.

As an example, comparison logic 170 may include a comparison operation that compares an amount of money spent to date on the first task to an amount of money spent to date on the second task. The comparison result may be a difference in dollars spent to date, for example. As another example, comparison logic 170 may include a comparison operation that compares a percentage of progress to date for the first task to a percentage of progress to date for the second task. The comparison result may be a difference in progress percentage to date.

In one embodiment, forecast logic 180 is configured to receive at least a first instruction (e.g., an instruction from visual user interface logic 120) to select a task node. The first instruction is in response to a user choosing the task node via the graphical user interface. In response to receiving the first instruction, forecast logic 180 is configured to select the task node. Forecast logic 180 is also configured to receive at least a second instruction (e.g., an instruction from visual user interface logic 120) to activate a forecast operation. The second instruction is in response to the user choosing the forecast operation via the graphical user interface.

Figure 9:
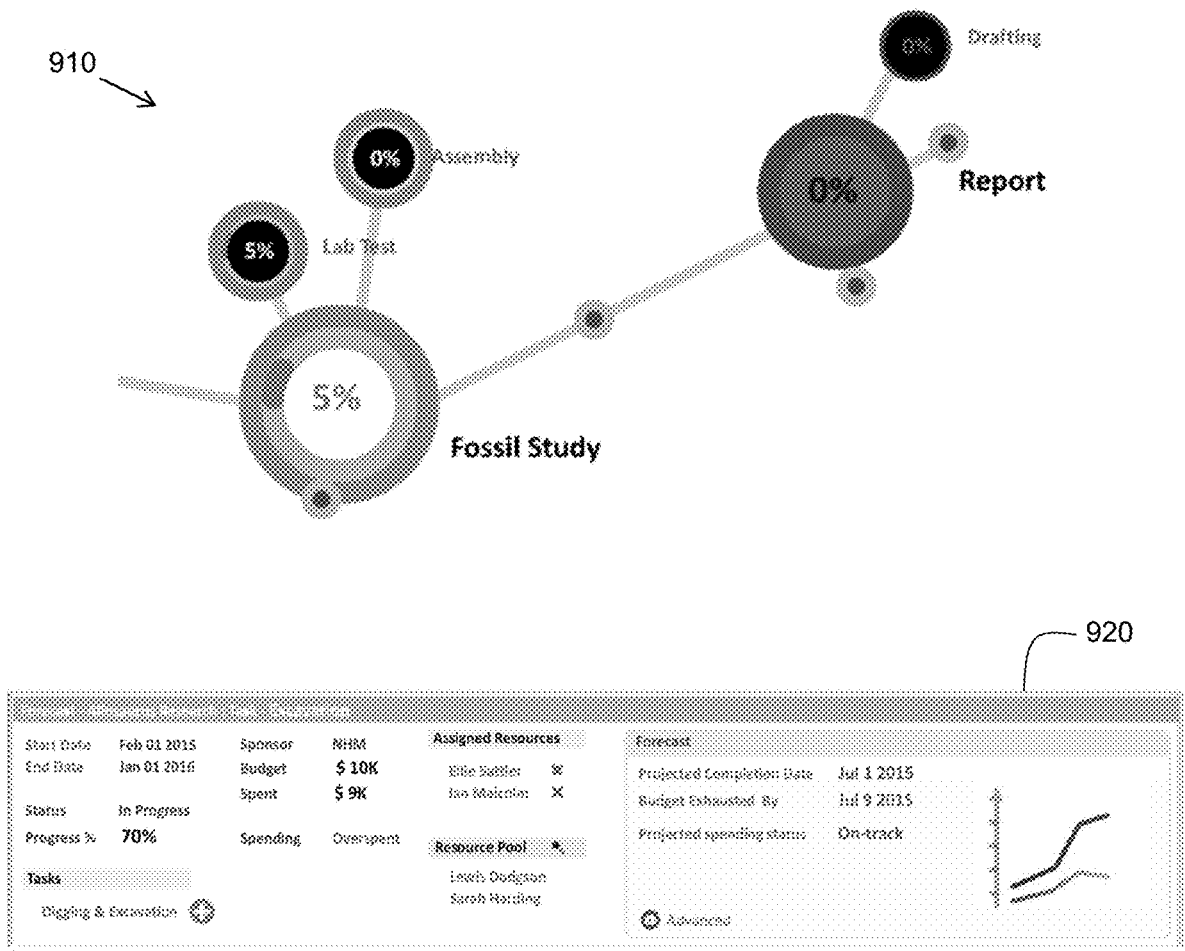
FIG. 9 illustrates example diagrams showing how a progress forecast can be generated for a task based on assigned resources.

In response to receiving the second instruction, forecast logic 180 is configured to activate the forecast operation to generate a forecast result for a task represented by the task node as selected. The forecast result predicts a future progress of the selected task and is generated based at least in part on a set of resources that have been assigned to the selected task. Forecast logic 180 is also configured to generate a forecast window within the graphical user interface. The forecast window includes the forecast result. The project plan is updated within the graphical user interface on the display screen 190 to include the forecast window having the forecast result. FIG. 9 illustrates example diagrams 910 and 920 showing how a progress forecast can be generated for a task based on assigned resources.

In one embodiment, forecast logic 180 is configured to receive at least a third instruction (e.g., an instruction from visual user interface logic 120) to modify a resource of the set of resources assigned to the selected task. For example, in one embodiment, the third instruction is in response to the user choosing to modify at least one resource in the forecast window via the graphical user interface. In response to receiving the third instruction, forecast logic 180 is configured to modify the resource and re-activate the forecast operation to generate an updated forecast result for the task represented by the task node as selected. The updated forecast result predicts a future progress of the selected task and is generated based at least in part on the set of resources as modified. Forecast logic 180 is also configured to generate an updated forecast window within the graphical user interface. The updated forecast window includes the updated forecast result. The project plan is updated within the graphical user interface on the display screen 190 to include the updated forecast window having the updated forecast result.

In this manner, a project manager can create, modify, and update a computerized project plan in a visually intuitive manner using the project management framework 110 of FIG. 1. The project management framework 110 provides a graphical user interface and logics that allow a user to easily manage a project plan while viewing the project plan on a display screen.

Systems, methods, and other embodiments have been described that are configured to control a display of project management objects. In one embodiment, task creation logic is configured to display a project plan within a graphical user interface on a display screen. The project plan includes multiple task nodes, each representing a task of the project plan, linked together by control nodes over a timeline that includes multiple dates. Task creation logic is also configured to receive an instruction to generate and link a new task node, representing a new task of the project plan, between two task nodes of the multiple task nodes in response to a user choosing a control node between the two task nodes via the graphical user interface. Task creation logic is further configured to display a task create window within the graphical user interface on the display screen in response to receiving the instruction. The task create window includes input fields to input task information to specify the new task represented by the new task node. Task creation logic is also configured to generate the new task node and link the new task node between the two task nodes, via two new control nodes, in response to the task information being input into the input fields. The new task node includes a child control node attached to the new task node. Timeline logic is configured to adjust the timeline of the project plan based on the new task node to generate an updated timeline of the project plan. Timeline logic is also configured to display an updated project plan within the graphical user interface on the display screen. The updated project plan includes the multiple task nodes and the new task node linked together over the updated timeline.

Computing Device Embodiment

Figure 10:
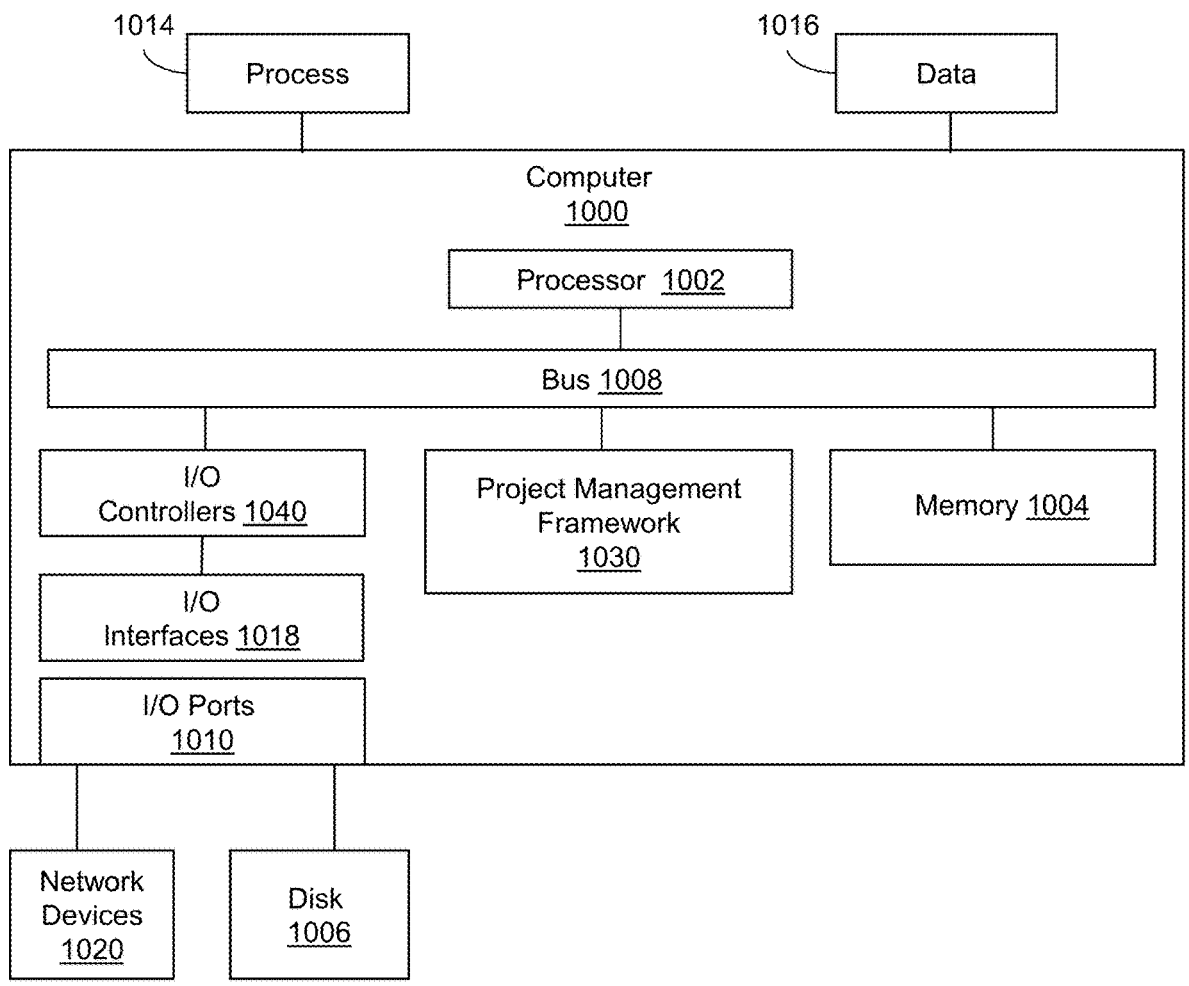
FIG. 10 illustrates one embodiment of a computing device upon which a project management framework of a computing system may be implemented.

FIG. 10 illustrates an example computing device that is configured and/or programmed with one or more of the example systems and methods described herein, and/or equivalents. FIG. 10 illustrates one example embodiment of a computing device upon which an embodiment of a project management framework may be implemented. The example computing device may be a computer 1000 that includes a processor 1002 and a memory 1004 operably connected by a bus 1008.

In one example, the computer 1000 may include project management framework 1030 (corresponding to project management framework 110 from FIG. 1) configured to control a display of project management objects. In different examples, the framework 1030 may be implemented in hardware, a non-transitory computer-readable medium with stored instructions, firmware, and/or combinations thereof. While the framework 1030 is illustrated as a hardware component attached to the bus 1008, it is to be appreciated that in other embodiments, the framework 1030 could be implemented in the processor 1002, a module stored in memory 1004, or a module stored in disk 1006.

In one embodiment, framework 1030 or the computer 1000 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to provide easier usability for creating, deleting, and updating tasks within a project plan. The means may also be implemented as stored computer executable instructions that are presented to computer 1000 as data 1016 that are temporarily stored in memory 1004 and then executed by processor 1002.

The framework 1030 may also provide means (e.g., hardware, non-transitory computer-readable medium that stores executable instructions, firmware) to easily update and display a project plan within a graphical user interface. The project plan may include multiple task nodes representing multiple tasks, and multiple sub-task nodes representing multiple sub-tasks of the multiple tasks.

Generally describing an example configuration of the computer 1000, the processor 1002 may be a variety of various processors including dual microprocessor and other multi-processor architectures. A memory 1004 may include volatile memory and/or non-volatile memory. Non-volatile memory may include, for example, ROM, PROM, and so on. Volatile memory may include, for example, RAM, SRAM, DRAM, and so on.

A storage disk 1006 may be operably connected to the computer 1000 via, for example, an input/output interface (e.g., card, device) 1018 and an input/output port 1010. The disk 1006 may be, for example, a magnetic disk drive, a solid state disk drive, a floppy disk drive, a tape drive, a Zip drive, a flash memory card, a memory stick, and so on. Furthermore, the disk 1006 may be a CD-ROM drive, a CD-R drive, a CD-RW drive, a DVD ROM, and so on. The memory 1004 can store a process 1014 and/or a data 1016, for example. The disk 1006 and/or the memory 1004 can store an operating system that controls and allocates resources of the computer 1000.

The computer 1000 may interact with input/output devices via the i/o interfaces 1018 and the input/output ports 1010. Input/output devices may be, for example, a keyboard, a microphone, a pointing and selection device, cameras, video cards, displays, the disk 1006, the network devices 1020, and so on. The input/output ports 1010 may include, for example, serial ports, parallel ports, and USB ports.

The computer 1000 can operate in a network environment and thus may be connected to the network devices 1020 via the i/o interfaces 1018, and/or the i/o ports 1010. Through the network devices 1020, the computer 1000 may interact with a network. Through the network, the computer 1000 may be logically connected to remote computers. Networks with which the computer 1000 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method performed by a computing device where the computing device includes at least a processor for executing instructions from a memory to control a display of objects, the method comprising:

displaying a project plan within a graphical user interface, wherein the project plan includes multiple task nodes, each representing a task to be completed, linked together by control nodes over a timeline that includes multiple dates, wherein each of the control nodes represents a trigger for creating a new task node, wherein the control node includes a linked list that links two task nodes such that each of the control nodes is represented as a project management display object within the graphical user interface and may be manipulated via a display screen on the graphical user interface;

in response to a user selecting a control node between two task nodes via the graphical user interface, receiving an instruction to generate and link the new task node, representing a new task, between the two task nodes of the multiple task nodes;

in response to selecting a control node, automatically displaying a task create window within the graphical user interface, wherein the task create window includes input fields to input task information to specify the new task represented by the new task node;

in response to the task information being inputted into the input fields of the task create window, automatically generating the new task node and automatically linking the new task node between the two task nodes, via two new control nodes such that the new task node is automatically linked between the two task nodes via a linked list and automatically generating a new child control node, wherein the new child control node is attached to the new task node, wherein the new child node is represented as a project management display object within the graphical user interface and may be manipulated by the user via the graphical user interface;

automatically adjusting the timeline of the project plan based on the addition of the new task node to generate an updated timeline of the project plan;

automatically displaying an updated project plan within the graphical user interface by adding the new task node and the child control node to the updated project plan, wherein the updated project plan includes the multiple task nodes and the new task node and the child control node attached to the new task node linked together over the updated timeline;

in response to selecting a task node from the multiple task nodes, displaying a context menu on the task node from which the user can select, delete, or replace the task node with another new task node to be created;

in response to a deletion of the task node from the multiple task nodes by the user, automatically displaying a second updated project plan within the graphical user interface by deleting the task node from the second updated project plan, wherein the second updated project plan does not include the deleted task node;

identifying a selection, via the graphical user interface, of a first task node having a first task and a second task node having a second task;

in response to receiving an instruction from the user to activate a comparison operation via the graphical user interface, activating the comparison operation to:
generate at least one comparison result by comparing at least one parameter associated with the first task with at least one corresponding parameter associated with the second task,
generate a comparison window within the graphical user interface, wherein the comparison window includes the at least one comparison result; and displaying a third updated project plan within the graphical user interface, wherein the third updated project plan includes at least the comparison window having the at least one comparison result.

2. The method of claim 1, wherein each of the multiple task nodes and the new task node include a central region showing a numerical metric, associated with a corresponding task to be completed, as part of the updated project plan as displayed within the graphical user interface.

3. The method of claim 1, further comprising:
in response to the user selecting the child control node attached to the new task node via the graphical user interface, receiving a second instruction to generate a sub-task node, representing a sub-task of the new task, and automatically linking the sub-task node to the new task node;

in response to selecting the child control node, automatically displaying a sub-task create window within the graphical user interface, wherein the sub-task create window includes second input fields to input sub-task information to specify the sub-task represented by the sub-task node;

in response to the task information being inputted into the second input fields of the sub-task create window, automatically generating the sub-task node and automatically linking the sub-task node to the new task node via the child control node;

automatically adjusting the updated timeline of the project plan based on the addition of the sub-task node to generate a second updated timeline of the project plan; and automatically displaying a fourth updated project plan within the graphical user interface by adding the new sub-task node to the fourth updated project plan, wherein the fourth updated project plan includes the multiple task nodes, the new task node, and the sub-task node linked together over the second updated timeline.

4. The method of claim 1, further comprising:
displaying a time slider within the graphical user interface as part of the updated project plan;
receiving a second instruction to scroll the time slider to a specific date within the updated timeline in response to the user grabbing and moving the time slider via the graphical user interface;
scrolling the time slider within the graphical user interface to the specific date, in response to the second instruction;

selecting a task node of the multiple task nodes, or the new task node, associated with the specific date in response to scrolling the time slider; and displaying a fourth updated project plan within the graphical user interface in response to the selecting, wherein the fourth updated project plan includes additional task information associated with the task node, or the new task node, as selected, and wherein the additional task information is displayed proximate to the task node, or the new task node, as selected.

5. The method of claim 1, further comprising:

receiving a second instruction to switch from a normal mode of the graphical user interface to a timeline mode of the graphical user interface in response to the user choosing the timeline mode via the graphical user interface;

switching from the normal mode to the timeline mode in response to receiving the second instruction; and displaying a fourth updated project plan within the graphical user interface in response to the switching, wherein the fourth updated project plan includes a time span within the graphical user interface for each of the multiple task nodes and the new task node, and wherein the time span identifies at least a start date and an end date between which a corresponding task is to be performed.

6. The method of claim 1, further comprising:

receiving a second instruction in response to the user grabbing and dragging a first task node of the multiple task nodes from a first position within the updated timeline to a second position within the updated timeline via the graphical user interface;

moving the first task node from the first position to the second position within the graphical user interface in response to the second instruction;

adjusting the updated timeline of the project plan, based on the moving of the first task node to the second position, to generate a second updated timeline of the project plan; and displaying a fourth updated project plan within the graphical user interface, wherein the fourth updated project plan includes the new task node and the multiple task nodes, with the first task node at the second position, linked together over the second updated timeline.

7. The method of claim 1, further comprising:

displaying a time slider within the graphical user interface as part of the updated project plan;

receiving a second instruction to activate a calendar function in response to the user choosing the time slider via the graphical user interface;

activating the calendar function, in response to the second instruction, to display a calendar within the graphical user interface;

receiving a third instruction to select a specific date in response to the user choosing the specific date from the calendar via the graphical user interface;

selecting the specific date in response to the third instruction; and displaying a fourth updated project plan within the graphical user interface, wherein the fourth updated project plan includes at least the time slider re-positioned within the updated time line at a new position corresponding to the specific date as selected.

8. The method of claim 1, further comprising:

receiving a second instruction to select a first task node of the multiple task nodes in response to the user choosing the first task node via the graphical user interface;

selecting the first task node in response to the second instruction;

receiving a third instruction to activate a forecast operation in response to the user choosing the forecast operation via the graphical user interface;

in response to receiving the third instruction, activating the forecast operation to:

generate a forecast result for a first task represented by the first task node as selected based on at least a set of resources assigned to the first task, wherein the forecast result predicts a future progress of the first task, and generate a forecast window within the graphical user interface, wherein the forecast window includes the forecast result; and displaying a fourth updated project plan within the graphical user interface, wherein the fourth updated project plan includes at least the forecast window having the forecast result.

9. The method of claim 8, further comprising:

receiving a fourth instruction to modify at least one resource of the set of resources in response to the user choosing to modify the at least one resource in the forecast window via the graphical user interface;

in response to receiving the fourth instruction, modifying the at least one resource and re-activating the forecast operation to:

generate an updated forecast result for the first task represented by the first task node, wherein the updated forecast result predicts the future progress of the first task based on at least the set of resources as modified, and generate an updated forecast window within the graphical user interface, wherein the updated forecast window includes the updated forecast result; and displaying a fifth updated project plan within the graphical user interface, wherein the fifth updated project plan includes at least the updated forecast window having the updated forecast result.

10. A computing system, comprising:

a processor;

a display screen;

a visual user interface module stored in a non-transitory computer-readable medium including instructions that when executed cause the processor to provide a graphical user interface;

a task creation module stored in the non-transitory computer-readable medium including instructions that when executed cause the processor to:

display a project plan within the graphical user interface on the display screen, wherein the project plan includes multiple task nodes, each representing a task of the project plan to be completed, linked together by control nodes over a timeline that includes multiple dates, wherein each of the control nodes represents a trigger for creating a new task node, wherein the control node includes a linked list that links two task nodes such that each of the control nodes is represented as a project management display object within the graphical user interface and may be manipulated via a display screen on the graphical user interface, in response to a user selecting a control node between two task nodes via the graphical user interface, receive an instruction to generate and link the new task node, representing a new task of the project plan, between the two task nodes of the multiple task nodes, in response to selecting a control node, automatically display a task create window within the graphical user interface on the display screen, wherein the task create window includes input fields to input task information to specify the new task represented by the new task node, and in response to the task information being inputted into the input fields of the task create window, automatically generate the new task node and automatically link the new task node between the two task node, via two new control nodes such that the new task node is automatically linked between the two task nodes via a linked list and automatically generate a new child control node, wherein the new child control node is attached to the new task node, wherein the new child node is represented as a project management display object within the graphical user interface and may be manipulated by the user via the graphical user interface; and a timeline module stored in the non-transitory computer-readable medium including instructions that when executed cause the processor to:

automatically adjust the timeline of the project plan based on the addition of the new task node to generate an updated timeline of the project plan, automatically display an updated project plan within the graphical user interface on the display screen by adding the new task node and the child control node to the updated project plan, wherein the updated project plan includes the multiple task nodes and the new task node and the child control node attached to the new task node linked together over the updated timeline;

in response to selecting a task node from the multiple task nodes, displaying a context menu on the task node from which the user can select, delete, or replace the task node with another new task node to be created;

in response to a deletion of the task node from the multiple task nodes by the user, automatically displaying a second updated project plan within the graphical user interface by deleting the task node from the second updated project plan, wherein the second updated project plan does not include the deleted task node;

identifying a selection, via the graphical user interface, of a first task node having a first task and a second task node having a second task;

in response to receiving an instruction from the user to activate a comparison operation via the graphical user interface, activating the comparison operation to:

generate at least one comparison result by comparing at least one parameter associated with the first task with at least one corresponding parameter associated with the second task, generate a comparison window within the graphical user interface, wherein the comparison window includes the at least one comparison result; and displaying a third updated project plan within the graphical user interface, wherein the third updated project plan includes at least the comparison window having the at least one comparison result.

11. The computing system of claim 10, wherein:

the task creation module stored in the non-transitory computer-readable medium includes instructions that when executed cause the processor to:

in response to the user selecting the child control node attached to the new task node via the graphical user interface, receive a second instruction to generate a sub-task node, representing a sub-task of the new task, and automatically link the sub-task node to the new task node, in response to selecting the child control node, automatically display a sub-task create window within the graphical user interface on the display screen, wherein the sub-task create window includes second input fields to input sub-task information to specify the sub-task represented by the sub-task node, and in response to the task information being inputted into the second input fields of the sub-task create window, automatically generate the sub-task node and automatically link the sub-task node to the new task node via the child control node; and the timeline module stored in the non-transitory computer-readable medium includes instructions that when executed cause the processor to:

automatically adjust the updated timeline of the project plan based on the addition of the sub-task node to generate a second updated timeline of the project plan, and automatically display a fourth updated project plan within the graphical user interface on the display screen by adding the new sub-task node to the fourth updated project plan, wherein the fourth updated project plan includes the multiple task nodes, the new task node, and the sub-task node linked together over the second updated timeline.

12. The computing system of claim 10, further comprising a time slider module stored in the non-transitory computer-readable medium including instructions that when executed cause the processor to:

display a time slider within the graphical user interface on the display screen as part of the updated project plan;

receive a second instruction to scroll the time slider to a specific date within the updated timeline in response to the user grabbing and moving the time slider via the graphical user interface;

scroll the time slider within the graphical user interface to the specific date, in response to the second instruction;

select a task node of the multiple task nodes, or the new task node, associated with the specific date in response to scrolling the time slider; and display a fourth updated project plan within the graphical user interface on the display screen in response to selecting the task node, or the new task node, wherein the fourth updated project plan includes additional task information associated with the task node, or the new task node, as selected, and wherein the additional task information is displayed proximate to the task node, or the new task node, as selected.

13. The computing system of claim 10, further comprising a mode selection module stored in the non-transitory computer-readable medium including instructions that when executed cause the processor to:

receive a second instruction to switch from a normal mode of the graphical user interface to a timeline mode of the graphical user interface in response to the user choosing the timeline mode via the graphical user interface;

switch from the normal mode to the timeline mode in response to receiving the second instruction; and display a fourth updated project plan within the graphical user interface on the display screen in response to switching from the normal mode to the timeline mode, wherein the fourth updated project plan includes a time span within the graphical user interface for each of the multiple task nodes and the new task node, and wherein the time span identifies at least a start date and an end date between which a corresponding task is to be performed.

14. The computing system of claim 10, further comprising a forecast module stored in the non-transitory computer-readable medium including instructions that when executed cause the processor to:

receive a second instruction to select a first task node of the multiple task nodes in response to the user choosing the first task node via the graphical user interface;

select the first task node in response to the second instruction;

receive a third instruction to activate a forecast operation in response to the user choosing the forecast operation via the graphical user interface; and in response to receiving the third instruction, activate the forecast operation to:

generate a forecast result for a first task represented by the first task node as selected based on at least a set of resources assigned to the first task, wherein the forecast result predicts a future progress of the first task, generate a forecast window within the graphical user interface, wherein the forecast window includes the forecast result, and display a fourth updated project plan within the graphical user interface on the display screen, wherein the fourth updated project plan includes at least the forecast window having the forecast result.

15. The computing system of claim 14, wherein:

the forecast module stored in the non-transitory computer-readable medium includes instructions that when executed cause the processor to:

receive a fourth instruction to modify at least one resource of the set of resources in response to the user choosing to modify the at least one resource in the forecast window via the graphical user interface; and in response to receiving the fourth instructions, modify the at least one resource and re-activate the forecast operation to:

generate an updated forecast result for the first task represented by the first task node, wherein the updated forecast result predicts the future progress of the first task based on at least the set or resources as modified, generate an updated forecast window within the graphical user interface, wherein the updated forecast window includes the updated forecast result, and display a fifth updated project plan within the graphical user interface on the display screen, wherein the fifth updated project plan includes at least the updated forecast window having the updated forecast result.

16. A non-transitory computer-readable medium storing instructions that, when executed by one or more processors of a computing device, cause the computing device to at least:

display a project plan within a graphical user interface, wherein the project plan includes multiple task nodes, each representing a task to be completed, linked together by control nodes over a timeline that includes multiple dates, wherein each of the control nodes represents a trigger for creating a new task node, wherein the control node includes a linked list that links two task nodes such that each of the control nodes is represented as a project management display object within the graphical user interface and may be manipulated via a display screen on the graphical user interface;

in response to a user selecting a control node between two task nodes via the graphical user interface, receive an instruction to generate and link the new task node, representing a new task of the project plan, between the two task nodes of the multiple task nodes, in response to selecting a control node, automatically display a task create window within the graphical user interface on the display screen, wherein the task create window includes input fields to input task information to specify the new task represented by the new task node, in response to the task information being inputted into the input fields of the task create window, automatically generate the new task node and automatically link the new task node between the two task nodes, via two new control nodes such that the new task node is automatically linked between the two task nodes via a linked and automatically generating a new child control node, wherein the new child control node is attached to the new task node, wherein the new child node is represented as a project management display object within the graphical user interface and may be manipulated by the user via the graphical user interface;

automatically adjust the timeline of the project plan based on the addition of the new task node to generate an updated timeline of the project plan;

automatically display an updated project plan within the graphical user interface by adding the new task node and the child control node to the updated project plan, wherein the updated project plan includes the multiple task nodes and the new task node and the child control node attached to the new task node linked together over the updated timeline;

in response to selecting a task node from the multiple task nodes, displaying a context menu on the task node from which the user can select, delete, or replace the task node with another new task node to be created;

in response to a deletion of the task node from the multiple task nodes by the user, automatically displaying a second updated project plan within the graphical user interface by deleting the task node from the second updated project plan, wherein the second updated project plan does not include the deleted task node;

identifying a selection, via the graphical user interface, of a first task node having a first task and a second task node having a second task;

in response to receiving an instruction from the user to activate a comparison operation via the graphical user interface, activating the comparison operation to:

generate at least one comparison result by comparing at least one parameter associated with the first task with at least one corresponding parameter associated with the second task, generate a comparison window within the graphical user interface, wherein the comparison window includes the at least one comparison result; and displaying a third updated project plan within the graphical user interface, wherein the second updated project plan includes at least the comparison window having the at least one comparison result.

17. The non-transitory computer-readable medium of claim 16, wherein the instructions further comprise instructions that, when executed by the one or more processors, cause the computing device to at least:

in response to the user selecting the child control node attached to the new task node via the graphical user interface, receive a second instruction to generate a sub-task node, representing a sub-task of the new task, and automatically link the sub-task node to the new task node;

in response to selecting the child control node, automatically display a sub-task create window within the graphical user interface on the display screen, wherein the sub-task create window includes second input fields to input sub-task information to specify the sub-task represented by the sub-task node;

in response to the task information being inputted into the second input fields of the sub-task create window, automatically generate the sub-task node and automatically link the sub-task node to the new task node via the child control node;

automatically adjust the updated timeline of the project plan based on the sub-task node to generate a second updated timeline of the project plan; and automatically display a fourth updated project plan within the graphical user interface by adding the sub-task node to the fourth updated project plan, wherein the fourth updated project plan includes the multiple task nodes, the new task node, and the sub-task node linked together over the second updated timeline.

18. The non-transitory computer-readable medium of claim 16, wherein each of the multiple task nodes and the new task node include a central region showing at least one numerical metric, associated with a corresponding task, as part of the updated project plan as displayed within the graphical user interface, and wherein the at least one numerical metric reflects at least a current amount of progress to completion of the corresponding task.

\* \* \* \* \*

UNITED STATES PATENT AND TRADEMARK OFFICE
CERTIFICATE OF CORRECTION

PATENT NO.        : 10,922,636 B2
APPLICATION NO.   : 15/331977
DATED             : February 16, 2021
INVENTOR(S)       : Asokan Page 1 of 1

It is certified that error appears in the above-identified patent and that said Letters Patent is hereby corrected as shown below:

In the Specification

In Column 8, Line 66, delete "a the" and insert -- the --, therefor.

In the Claims

In Column 22, Line 30, in Claim 16, after "linked" insert -- list --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*